US012170775B2

(12) United States Patent
Shima

(10) Patent No.: US 12,170,775 B2
(45) Date of Patent: *Dec. 17, 2024

(54) IMAGE DECODING DEVICE, METHOD, AND NON-TRANSITORY COMPUTER-READABLE STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,344

(22) Filed: Nov. 15, 2023

(65) Prior Publication Data

US 2024/0089443 A1 Mar. 14, 2024

Related U.S. Application Data

(63) Continuation of application No. 17/542,254, filed on Dec. 3, 2021, now Pat. No. 11,856,198, which is a
(Continued)

(30) Foreign Application Priority Data

Jun. 7, 2019 (JP) ................................. 2019-107454

(51) Int. Cl.
*H04N 19/126* (2014.01)
*H04N 19/18* (2014.01)
*H04N 19/186* (2014.01)
(52) U.S. Cl.
CPC ........... *H04N 19/126* (2014.11); *H04N 19/18* (2014.11); *H04N 19/186* (2014.11)

(58) Field of Classification Search
CPC ..... H04N 19/126; H04N 19/18; H04N 19/186
(Continued)

(56) References Cited

U.S. PATENT DOCUMENTS

2008/0170615 A1* 7/2008 Sekiguchi .............. H04N 19/82
375/240.12
2011/0249755 A1* 10/2011 Shibahara ............ H04N 19/129
375/240.18
(Continued)

FOREIGN PATENT DOCUMENTS

CN 101790094 A 7/2010
CN 102164284 A 8/2011
(Continued)

OTHER PUBLICATIONS

Wang Shuhui, Design and Implementation for Chroma Extensions Video Coding Based on AVS2 Platform, Journal of Electronics & Information Technology, Dec. 2018, vol. 4, No. 12, Shanghai, China.

*Primary Examiner* — Allen C Wong
(74) *Attorney, Agent, or Firm* — Canon U.S.A., Inc. IP Division

(57) ABSTRACT

An image coding device that suppresses degradation of subjective image quality while improving the coding efficiency of residual coefficients of two chroma components. The image coding device that codes image data constituted by one luma component and two chroma components, comprises quantizing unit that performs an orthogonal transform on each of components of a block obtained by dividing an image to be coded, and quantizes transform coefficients of each of the components obtained from the orthogonal transform; and coding unit that codes residual coefficients obtained by the quantizing unit, wherein when coding the transform coefficients of the orthogonal transform of the two chroma components in an integrated manner, the coding unit
(Continued)

quantizes transform coefficients of the orthogonal transform obtained from the integration using a predetermined quantization matrix, and codes residual coefficients obtained from the quantizing.

9 Claims, 12 Drawing Sheets

Related U.S. Application Data continuation of application No. PCT/JP2020/015216, filed on Apr. 2, 2020.

(58) Field of Classification Search
USPC .................................................... 375/240.03
See application file for complete search history.

(56) References Cited

U.S. PATENT DOCUMENTS

| | | |
|---|---|---|
| 2015/0245026 A1 | 8/2015 | Sze |
| 2019/0007681 A1 | 1/2019 | Tsai |
| 2022/0417515 A1 | 12/2022 | Chen |

FOREIGN PATENT DOCUMENTS

| | | |
|---|---|---|
| CN | 102918843 A | 2/2013 |
| CN | 107360419 A | 11/2017 |
| CN | 107509077 A | 12/2017 |
| TW | 200400767 A | 1/2004 |
| TW | 201808004 A | 3/2018 |

\* cited by examiner

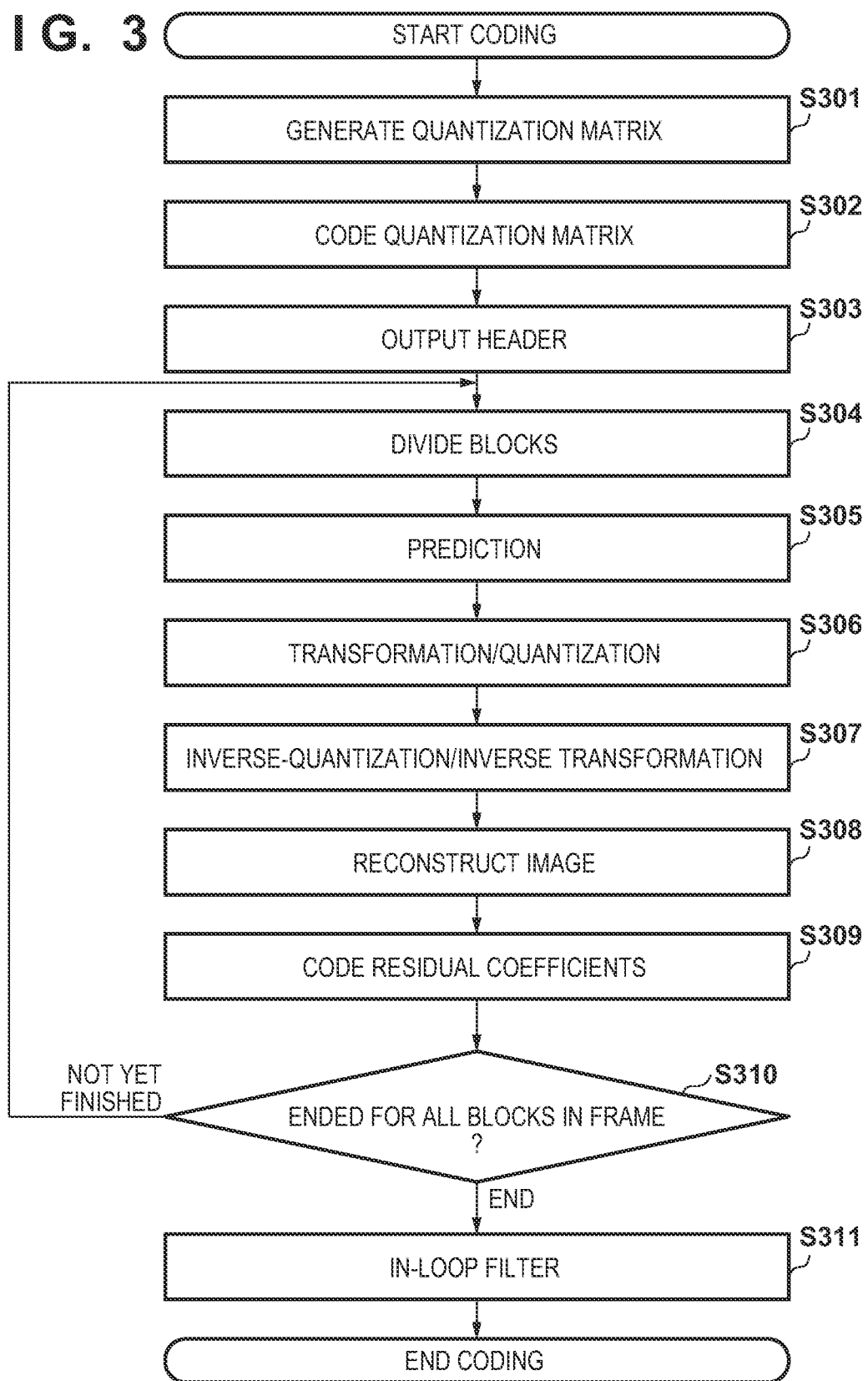

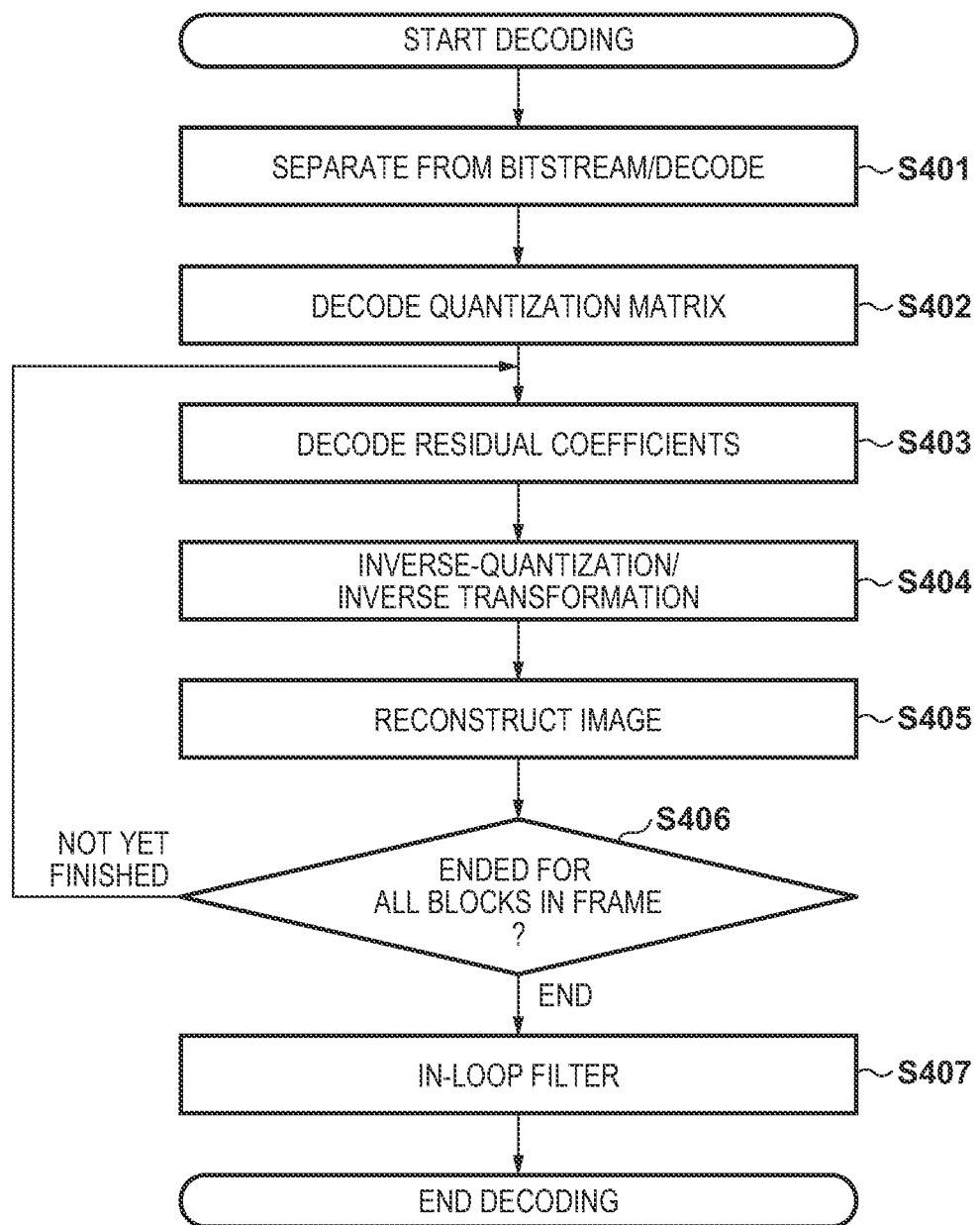

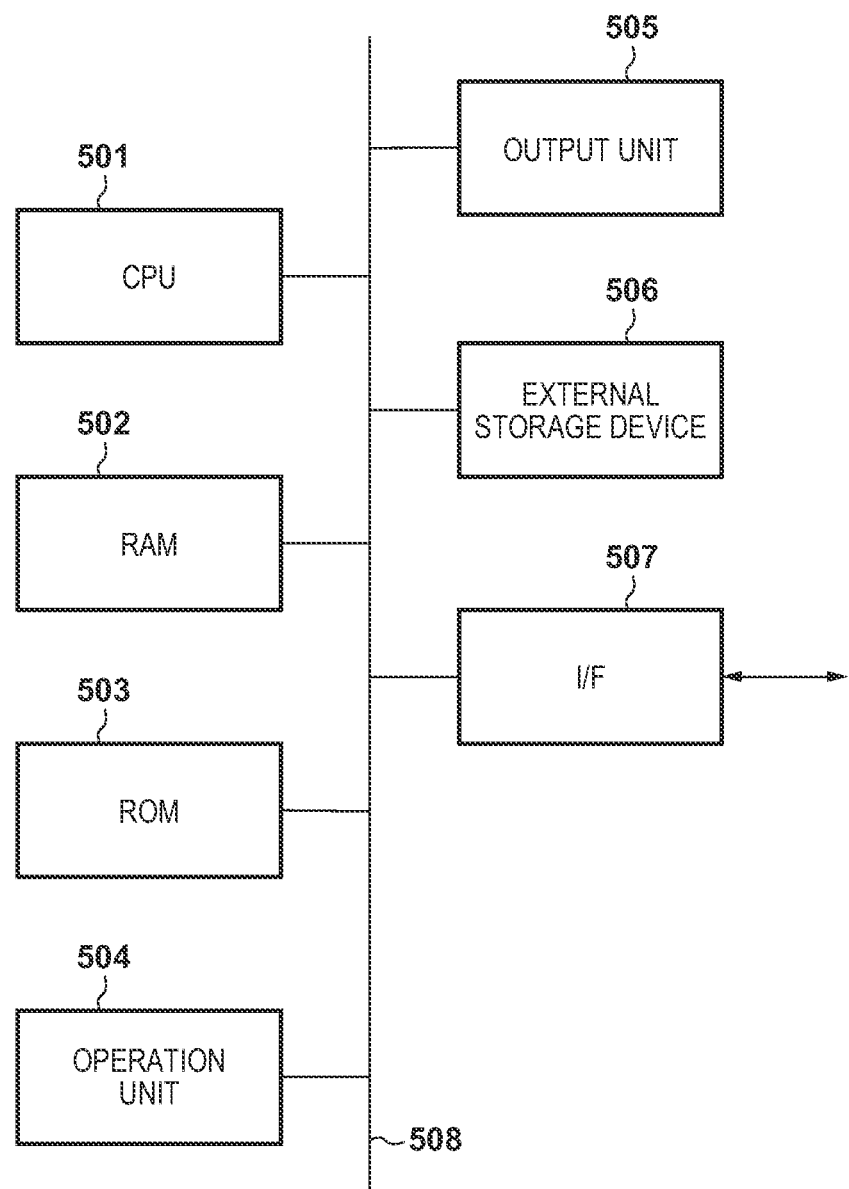

F I G. 6A
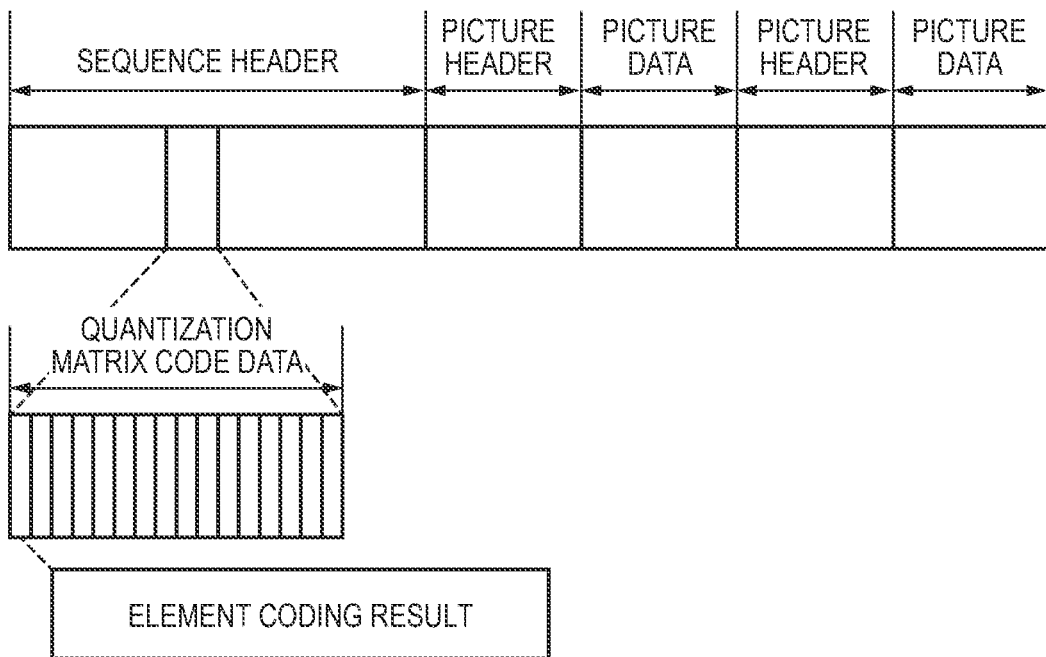
F I G. 6B
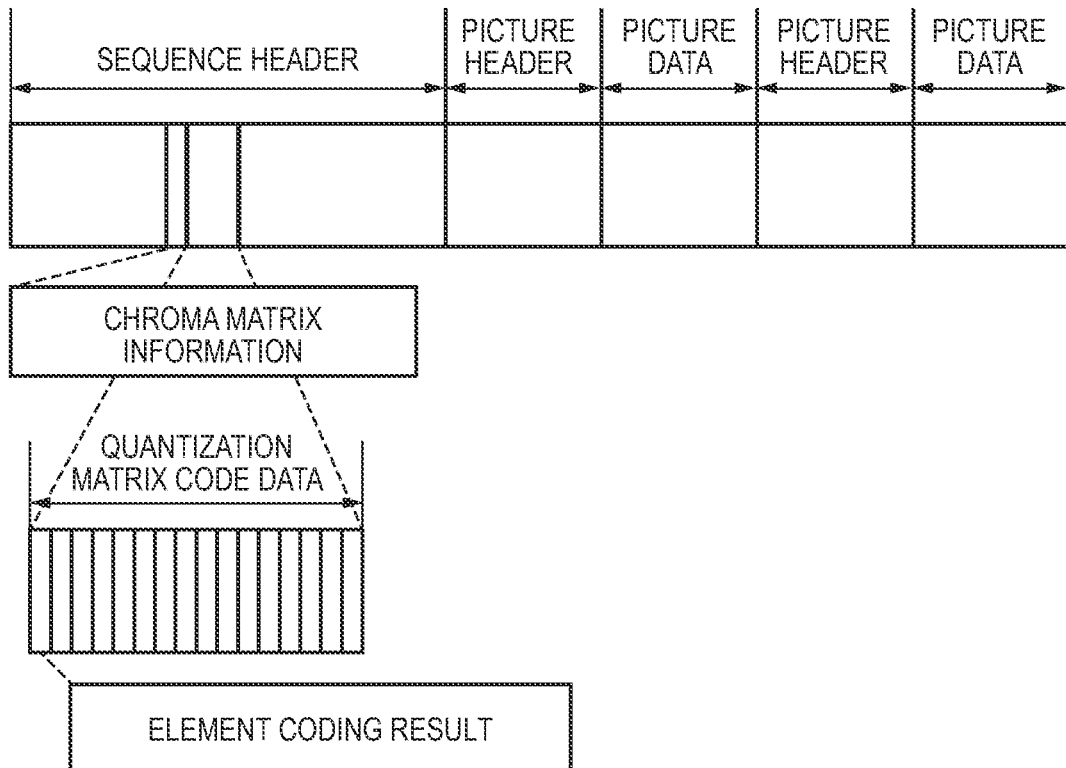

FIG. 8A

| 6 | 10 | 13 | 16 | 18 | 23 | 25 | 27 |
|---|---|---|---|---|---|---|---|
| 10 | 11 | 16 | 18 | 23 | 25 | 27 | 29 |
| 13 | 16 | 18 | 23 | 25 | 27 | 29 | 31 |
| 16 | 18 | 23 | 25 | 27 | 29 | 31 | 33 |
| 18 | 23 | 25 | 27 | 29 | 31 | 33 | 36 |
| 23 | 25 | 27 | 29 | 31 | 33 | 36 | 38 |
| 25 | 27 | 29 | 31 | 33 | 36 | 38 | 40 |
| 27 | 29 | 31 | 33 | 36 | 38 | 40 | 42 |

| 9 | 15 | 19 | 22 |
|---|---|---|---|
| 15 | 19 | 22 | 25 |
| 19 | 22 | 25 | 28 |
| 22 | 25 | 28 | 32 |

| 8 | 14 | 19 | 24 |
|---|---|---|---|
| 14 | 19 | 24 | 27 |
| 19 | 24 | 27 | 31 |
| 24 | 27 | 31 | 35 |

| 8 | 14 | 19 | 23 |
|---|---|---|---|
| 14 | 19 | 23 | 26 |
| 19 | 23 | 26 | 29 |
| 23 | 26 | 29 | 33 |

| -2 | 4 | 0 | 3 | -2 | 2 | 3 | 0 | 0 | 0 | 2 | 0 | 0 | 0 | 0 | ... |
|----|---|---|---|----|---|---|---|---|---|---|---|---|---|---|-----|

| 1 | 6 | 0 | 4 | 0 | 0 | 3 | 0 | 0 | 0 | 3 | 0 | 0 | 3 | 0 | 4 |
|---|---|---|---|---|---|---|---|---|---|---|---|---|---|---|---|

| 0 | 6 | 0 | 5 | 0 | 0 | 5 | 0 | 0 | 0 | 3 | 0 | 0 | 4 | 0 | 4 |
|---|---|---|---|---|---|---|---|---|---|---|---|---|---|---|---|

| CODING TARGET VALUE | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG. 11B

| CODING TARGET VALUE | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

IMAGE DECODING DEVICE, METHOD, AND NON-TRANSITORY COMPUTER-READABLE STORAGE MEDIUM

CROSS-REFERENCE TO RELATED APPLICATIONS

This application is a Continuation of U.S. patent application Ser. No. 17/542,254, filed on Dec. 3, 2021, which is a Continuation of International Patent Application No. PCT/JP2020/015216, filed Apr. 2, 2020, which claims the benefit of Japanese Patent Application No. 2019-107454, filed Jun. 7, 2019, both of which are hereby incorporated by reference herein in their entirety.

BACKGROUND OF THE DISCLOSURE

Field of the Disclosure

The present disclosure relates to an image decoding device, a method, and a non-transitory computer-readable storage medium.

Background Art

The High Efficiency Video Coding (HEVC) coding method ("HEVC" hereinafter) is known as a coding scheme for compressed recording of moving images. In order to improve coding efficiency, HEVC employs basic blocks that are larger in size than conventional macro blocks (16×16 pixels). This large-size basic block is called a Coding Tree Unit (CTU) and has a maximum size of 64×64 pixels. The CTU is further divided into sub-blocks that serve as units for prediction, conversion, and the like.

Additionally, a process called a "quantization matrix", in which a collection of coefficients that have undergone an orthogonal transform ("orthogonal transform coefficients" hereinafter) is weighted according to frequency components, is used in HEVC. Reducing more high-frequency component data, where degradation is less noticeable to the human eye, makes it possible to increase compression efficiency while maintaining image quality. PTL 1 discloses a technique for coding such a quantization matrix.

Recently, activities have been initiated to develop an international standard for an even more efficient coding scheme as a successor to HEVC. Joint Video Experts Team (WET) has been established by the ISO/IEC with the ITU-T, and standardization is being promoted as the Versatile Video Coding (VVC) coding scheme ("VVC" hereinafter). In order to improve the coding efficiency, a new coding method is being considered for VVC, in which the residual coefficients after quantization of two chroma components (a Cb component and a Cr component) are coded together ("integrated chroma residual coefficient coding" hereinafter).

Like HEVC, the introduction of a quantization matrix is being considered for VVC. However, the quantization matrix in HEVC assumes quantization and inverse quantization processes for luma (Y) and chroma (Cb, Cr) components, and does not support the new coding method of integrated chroma residual coefficient coding. There is thus an issue in that when using integrated chroma residual coefficient coding, it is not possible to control the quantization according to frequency components, and thus the subjective image quality cannot be improved. As such, having been made to solve the above-mentioned issue, there is a need in the art to improve subjective image quality by enabling quantization processing using a quantization matrix that is also compatible with integrated chroma residual coefficient coding.

CITATION LIST

Patent Literature

PTL 1: Japanese Patent Laid-Open No. 2013-38758

SUMMARY OF DISCLOSURE

To solve this issue, an image decoding device according to the present disclosure has, for example, the following configuration.

That is, an image decoding device decoding coded data of an image, comprising: a decoding unit configured to decode, from the coded data, data corresponding to quantized transform coefficients; and a deriving unit configured to derive prediction errors from the decoded data by performing at least inverse quantization using a quantization matrix, wherein prediction errors corresponding to a chroma component can be derived using a first mode, wherein the image includes a plurality of chroma components, wherein the first mode is a mode in which encoding of first quantized transform coefficients associated with a first chroma component among the plurality of chroma components is omitted in the coded data, wherein, in the first mode, the deriving unit is configured to derive first prediction errors of the first chroma component, using quantized transform coefficients associated with a chroma component different from the first chroma component, and wherein, in the first mode, the deriving unit is configured to perform inverse quantization on the quantized transform coefficients used to derive the first prediction errors of the first chroma component, using the quantizing matrix corresponding to the chroma component different from the first chroma component.

Further features of the present disclosure will become apparent from the following description of exemplary embodiments with reference to the attached drawings.

BRIEF DESCRIPTION OF DRAWINGS

FIG. 3 is a flowchart illustrating an example of image coding processing in the image coding device according to the first embodiment.

FIG. 4 is a flowchart illustrating image decoding processing in the image decoding device according to the first embodiment.

FIG. 5 is a diagram illustrating a computer hardware configuration applied in a second embodiment.

FIG. 6A is a diagram illustrating an example of the data structure of a bitstream generated in an embodiment.

FIG. 6B is a diagram illustrating an example of the data structure of a bitstream generated in an embodiment.

FIG. 8A is a diagram illustrating an example of a quantization matrix used in an embodiment.

FIG. 8B is a diagram illustrating an example of a quantization matrix used in an embodiment.

FIG. 8C is a diagram illustrating an example of a quantization matrix used in an embodiment.

FIG. 8D is a diagram illustrating an example of a quantization matrix used in an embodiment.

FIG. 10A is a diagram illustrating a difference value matrix of a quantization matrix generated in an embodiment.

FIG. 10B is a diagram illustrating a difference value matrix of a quantization matrix generated in an embodiment.

FIG. 10C is a diagram illustrating a difference value matrix of a quantization matrix generated in an embodiment.

FIG. 11A is a diagram illustrating an example of a coding table used to code difference values of a quantization matrix.

FIG. 11B is a diagram illustrating an example of a coding table used to code difference values of a quantization matrix.

DESCRIPTION OF EMBODIMENTS

Figure 1:
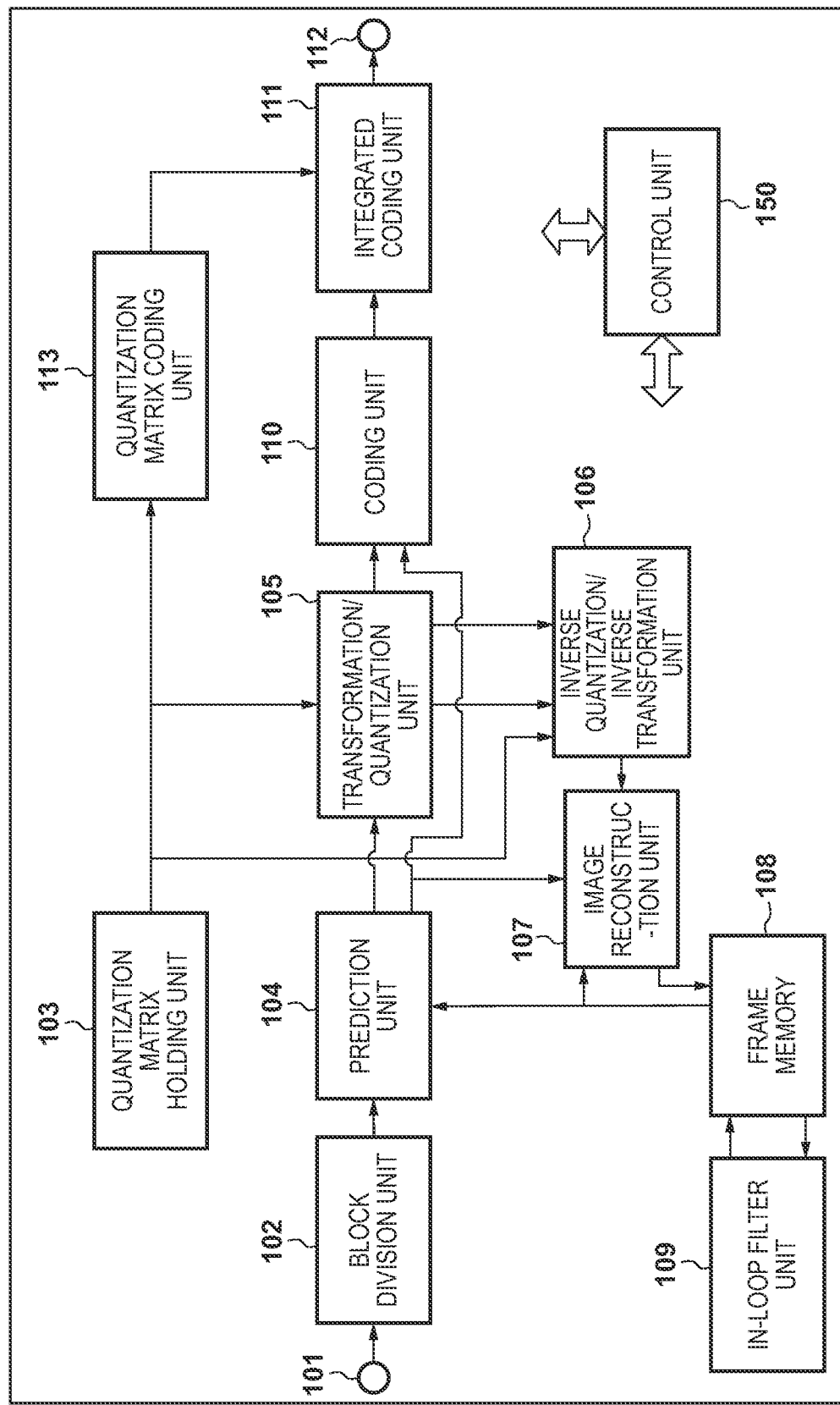
FIG. 1 is a block diagram illustrating an image coding device according to a first embodiment.

Hereinafter, embodiments will be described in detail with reference to the attached drawings. Note, the following embodiments are not intended to limit the scope of the present disclosure. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating an image coding device according to the present embodiment. The image coding device includes a control unit 150 that controls the device as a whole. This control unit 150 includes a CPU, ROM that stores programs executed by the CPU, and RAM used as a work area for the CPU. The image coding device also includes an input terminal 101, a block division unit 102, a quantization matrix holding unit 103, a prediction unit 104, a transformation/quantization unit 105, an inverse quantization/inverse transformation unit 106, an image reconstruction unit 107, frame memory 108, an in-loop filter unit 109, a coding unit 110, an integrated coding unit 111, an output terminal 112, and a quantization matrix coding unit 113.

The input terminal 101 inputs, in units of frames, image data to be coded, which has been generated by an image data source. The image data source may be any type of device, such as an image capturing device, a file server, storage medium, or the like that stores the image data to be coded, and the like. The output terminal 112 outputs coded data to an output destination device, and the output destination device may also be a storage medium, a file server, or the like.

The block division unit 102 divides the image of an input frame into a plurality of basic blocks, and outputs one as a basic block to the prediction unit 104 in a subsequent stage in order.

The quantization matrix holding unit 103 generates a plurality of quantization matrices prior to coding and holds the quantization matrices in internal memory (not shown). Although the method for generating the quantization matrices is not particularly limited, a user may input the quantization matrices, the quantization matrices may be computed from characteristics of the input image, quantization matrices specified in advance as initial values may be used, or the like. The quantization matrix holding unit 103 according to the present embodiment generates and holds a two-dimensional quantization matrix 800 corresponding to the orthogonal transform of 8×8 pixels illustrated in FIG. 8A, and two-dimensional quantization matrices 801 and 802 corresponding to the orthogonal transform of 4×4 pixels illustrated in FIGS. 8B and 8C. The quantization matrix 800 is a quantization matrix for a luma component, and the quantization matrices 801 and 802 are quantization matrices for two chroma components.

The prediction unit 104 determines a sub-block division for the image data in basic block units, and generates predicted image data by performing intra prediction, which is prediction within a frame in units of sub-blocks, inter prediction, which is prediction between frames, and the like. The prediction unit 104 furthermore calculates and outputs prediction error(s), in units of pixels, from the input image data and the predicted image data. The prediction unit 104 also outputs information necessary for prediction, e.g., information on sub-block division, prediction mode, motion vectors, and the like, along with the prediction errors. The information necessary for prediction will be called "prediction information" hereinafter.

The transformation/quantization unit 105 obtains orthogonal transform coefficients (residual coefficients that have undergone an orthogonal transform) by performing, in units of sub-blocks, an orthogonal transform on the prediction errors input from the prediction unit 104. Furthermore, the transformation/quantization unit 105 obtains quantized residual coefficients (quantized orthogonal transform coefficients) by quantizing the orthogonal transform coefficients using the quantization matrices stored in the quantization matrix holding unit 103.

The inverse quantization/inverse transformation unit 106 inputs the residual coefficients from the transformation/quantization unit 105, inverse-quantizes the residual coefficients using the quantization matrices stored in the quantization matrix holding unit 103, and reconstructs the orthogonal transform coefficients. The inverse quantization/inverse transformation unit 106 furthermore performs an inverse orthogonal transform and reconstructs the prediction errors.

The image reconstruction unit 107 generates predicted image data by referring to the frame memory 108 as appropriate on the basis of the prediction information output from the prediction unit 104. The image reconstruction unit 107 generates reconstructed image data by adding the prediction errors from the inverse quantization/inverse transformation unit 106 to the predicted image data, and stores the reconstructed image data in the frame memory 108.

The in-loop filter unit 109 performs in-loop filter processing, such as deblocking filtering, sample adaptive offset, and the like, on the reconstructed image stored in the frame memory 108, and stores the filtered image data in the frame memory 108 again.

The coding unit 110 generates code data by coding the residual coefficients output from the transformation/quantization unit 105 and the prediction information output from the prediction unit 104, and outputs the code data to the integrated coding unit 111.

The quantization matrix coding unit 113 generates quantization matrix code data by coding the quantization matrices held in the quantization matrix holding unit 103, and outputs the quantization matrix code data to the integrated coding unit 111.

The integrated coding unit 111 generates header code data including the quantization matrix code data from the quantization matrix coding unit 113. The integrated coding unit 111 then forms a bitstream by adding the code data output from the coding unit 110 after the header code data. The integrated coding unit 111 then outputs the formed bitstream via the output terminal 112.

A more detailed description of the operations for coding an image in the image coding device will be given next. The present embodiment assumes a configuration in which moving image data in 4:2:0 color format is input from the input terminal 101 in units of frames, but the configuration may be such that one frame's worth of still image data is input. Additionally, to simplify the descriptions, only intra predictive coding processing will be described in the present embodiment; however, the present embodiment is not limited thereto, and can also be applied in inter predictive coding processing. Additionally, for descriptive purposes, the present embodiment assumes that the block division unit 102 divides the image data input from the input terminal into basic blocks constituted by 8×8 pixels. In other words, a basic block of 8×8 pixels contains 8×8 pixels of the luma (Y) component and 4×4 pixels of the chroma (Cb and Cr) components. Note that this is only to facilitate understanding, and the configuration is not limited to the stated values (sizes).

The quantization matrices are generated and coded before coding the image.

Figure 7A:
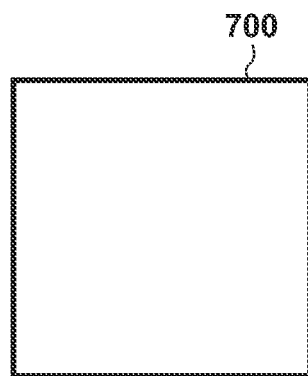
FIG. 7A is a diagram illustrating an example of sub-block division according to an embodiment.

The quantization matrix holding unit 103 first generates and holds the quantization matrices. Specifically, the quantization matrices are generated according to the size of the sub-block to be coded, the type of prediction method, and the like. In the present embodiment, quantization matrices corresponding to the basic block of 8×8 pixels which is not divided into sub-blocks, as illustrated in FIG. 7A, are generated. In other words, the quantization matrix holding unit 103 generates an 8×8 quantization matrix for the luma (Y) component and 4×4 quantization matrices for the chroma (Cb and Cr) components. However, the quantization matrices generated are not limited thereto, and quantization matrices corresponding to the shape of the sub-blocks, such as 4×8, 8×4, and the like may be generated. The method for determining each element of the quantization matrices is not particularly limited. For example, a predetermined initial value may be used, or the elements can be set individually. The matrices may also be generated according to the characteristics of the image.

The quantization matrix holding unit 103 holds the quantization matrices generated in this manner in internal memory (not shown). FIG. 8A illustrates the quantization matrix 800 for the Y component. FIG. 8B illustrates the quantization matrix 801 for the Cb component, and FIG. 8C illustrates the quantization matrix 802 for the Cr component. To simplify the descriptions, it is assumed that the quantization matrices are constituted by 64 pixels (8×8) and 16 pixels (4×4), and that each square in the bold frame represents an element of the quantization matrix. In the present embodiment, the three quantization matrices illustrated in FIGS. 8A to 8C are assumed to be held in a two-dimensional shape, but the elements in the quantization matrices are of course not limited thereto. It is also possible to hold a plurality of quantization matrices for the same color component, depending on the size of the sub-block, or on the type of prediction method described later, e.g., whether intra prediction or inter prediction is used. In general, a quantization matrix implements quantization processing according to human visual characteristics, and as such, the elements of a low-frequency part, corresponding to the upper-left part of the quantization matrices 800 to 802, are small, while the elements of a high-frequency part, corresponding to the lower-right part, are large, as illustrated in FIGS. 8A to 8C.

Figure 9A:
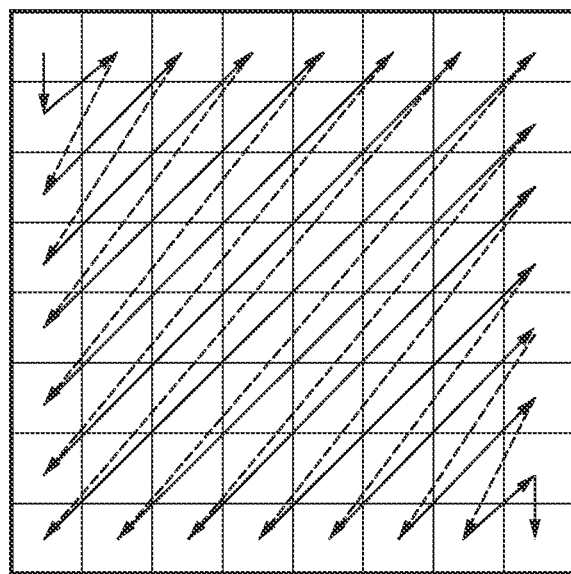
FIG. 9A is a diagram illustrating a method of scanning elements of a quantization matrix used in an embodiment.
Figure 9B:
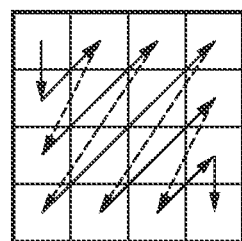
FIG. 9B is a diagram illustrating a method of scanning elements of a quantization matrix used in an embodiment.

The quantization matrix coding unit 113 reads out the two-dimensional quantization matrices held in the quantization matrix holding unit 103 in order, calculates a difference between the previous and next elements obtained by scanning each element, and arranges the differences in a one-dimensional matrix. The present embodiment assumes that depending on the sizes of the quantization matrices 800 to 802 illustrated in FIGS. 8A to 8C, the scanning method illustrated in FIG. 9A or FIG. 9B is used to calculate the difference between each element and the element immediately previous thereto in the scanning order. For example, the quantization matrix 802 for 4×4 pixels, illustrated in FIG. 8C is scanned using the scanning method illustrated in FIG. 9B, and after the first element 8 located in the upper-left, the element 14 located immediately therebelow is scanned and the difference, +6, is calculated. Additionally, when coding the first element of the quantization matrix (8 in the present embodiment), the difference from a predetermined initial value (e.g. 8) is assumed to be calculated; however, the configuration is not limited thereto, and the difference from any value or the value of the first element itself may be used. In short, the value may be any value as long as it is the same initial value as with the decoding device.

In this manner, for the quantization matrix 800 illustrated in FIG. 8A, the quantization matrix coding unit 113 generates a difference matrix using the scanning method in FIG. 9A. Likewise, for the quantization matrices 801 and 802 illustrated in FIGS. 8B and 8C, the quantization matrix coding unit 113 generates a difference matrix using the scanning method in FIG. 9B. FIG. 10A illustrates a difference matrix 1000 obtained from the quantization matrix 800 in FIG. 8A. FIG. 10B illustrates a difference matrix 1002 obtained from the quantization matrix 801 in FIG. 8B. Finally, FIG. 10C illustrates a difference matrix 1003 obtained from the quantization matrix 802.

The quantization matrix coding unit 113 generates quantization matrix code data by further coding each difference matrix generated as described above. Using the coding table illustrated in FIG. 11A, the quantization matrix coding unit 113 of the present embodiment performs the coding by adding code words to each element of the difference matrix, and generates the quantization matrix code data. Note that the coding table is not limited thereto, and the coding table illustrated in FIG. 11B, for example, may be used. In this manner, the quantization matrix coding unit 113 outputs the generated quantization matrix code data to the integrated coding unit 111 in a subsequent stage.

Returning to FIG. 1, the integrated coding unit 111 integrates the code data of the quantization matrices with header information necessary for coding the image data.

Next, the image data is coded. One frame's worth of image data input from the input terminal 101 is supplied to the block division unit 102. The block division unit 102 divides the one frame of input image data into a plurality of basic blocks, and outputs the image data to the prediction unit 104 in units of basic blocks. In the present embodiment, the image data is supplied to the prediction unit 104 in units of basic blocks of 8×8 pixels.

The prediction unit 104 executes prediction processing on the image data in units of basic blocks input from the block division unit 102. Specifically, sub-block divisions for dividing the basic blocks into even finer sub-blocks are determined, and an intra prediction mode such as horizontal prediction or vertical prediction is furthermore determined in units of sub-blocks.

Figure 7B:
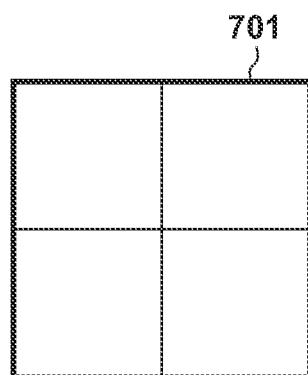
FIG. 7B is a diagram illustrating an example of sub-block division according to an embodiment.
Figure 7C:
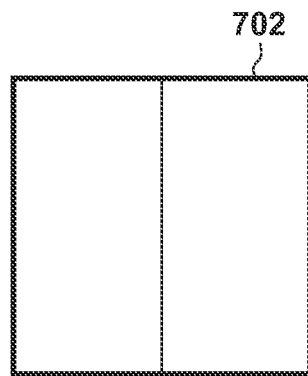
FIG. 7C is a diagram illustrating an example of sub-block division according to an embodiment.
Figure 7D:
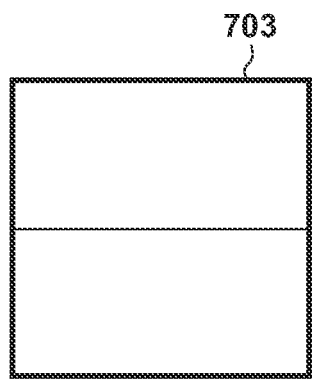
FIG. 7D is a diagram illustrating an example of sub-block division according to an embodiment.
Figure 7E:
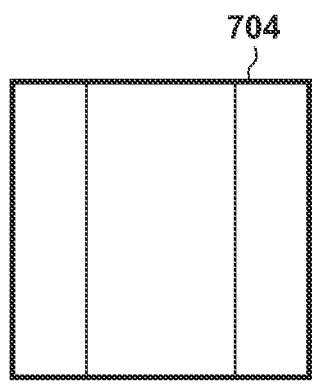
FIG. 7E is a diagram illustrating an example of sub-block division according to an embodiment.
Figure 7F:
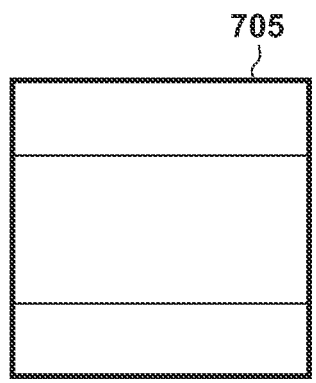
FIG. 7F is a diagram illustrating an example of sub-block division according to an embodiment.

A sub-block division method will be described with reference to FIGS. 7A to 7F. The bold frames in blocks 700 to 705 in FIGS. 7A to 7F indicate a size of 8×8 pixels, which is the same as the basic block. The quadrangles within the bold frames indicate sub-blocks. FIG. 7B illustrates an example of conventional square sub-block division, where an 8×8-pixel basic block 701 is divided into four 4×4-pixel sub-blocks. On the other hand, FIGS. 7C to 7F illustrate examples of rectangular sub-block division. FIG. 7C illustrates a basic block 702 being divided into two sub-blocks that are 4×8 pixels in size (longer in the vertical direction). FIG. 7D illustrates a basic block 703 being divided into two sub-blocks that are 8×4 pixels in size (longer in the horizontal direction). In basic blocks 704 and 705 in FIGS. 7E and 7F, the blocks are divided into three rectangular sub-blocks at a ratio of 1:2:1, with the direction of division differing. In this manner, the coding processing is performed using not only square sub-blocks, but also rectangular sub-blocks.

Although the present embodiment assumes that only the block illustrated in FIG. 7A, which is not divided into sub-blocks, is used as a basic block having a size of 8×8 pixels, the sub-block division method is not limited thereto. Quad-tree division such as that illustrated in FIG. 7B, trichotomous tree division such as that illustrated in FIGS. 7E and 7F, or dichotomous tree division such as that illustrated in FIGS. 7C and 7D may be used as well. When sub-block division aside from that illustrated in FIG. 7A is used as well, quantization matrices corresponding to the sub-blocks used are generated in the quantization matrix holding unit 103. The generated quantization matrices are also coded by the quantization matrix coding unit 113.

The prediction unit 104 generates the predicted image data on the basis of the determined prediction mode and already-coded regions stored in the frame memory 108, furthermore calculates the prediction error(s), in units of pixels, from the input image data and the predicted image data, and outputs the prediction errors to the transformation/quantization unit 105. The prediction unit 104 also outputs information such as the sub-block division, the prediction mode, and the like to the coding unit 110 and the image reconstruction unit 107 as the prediction information.

The transformation/quantization unit 105 generates the residual coefficients by performing orthogonal transform and quantization on the prediction errors input from the prediction unit 104. In parallel with this, the transformation/quantization unit 105 determines whether or not to use integrated chroma residual coefficient coding, which codes the residual coefficients of the components Cb and Cr together.

The integrated chroma residual coefficient coding used in the present embodiment will be described here. "Integrated chroma residual coefficient coding" reduces the generated code amount and improves the coding efficiency by coding only one residual coefficient and omitting coding of the other residual coefficient when there is a high correlation between the Cb and Cr residual coefficients. On the decoding side, only one of the coded chroma residual coefficients is decoded, and the other chroma residual coefficient is reconstructed by being calculated using the decoded chroma residual coefficient. In the present embodiment, for example, integrated chroma residual coefficient coding is performed only when the Cb residual coefficient and the Cr residual coefficient are in a negative correlation relationship, and the coding unit 110 in a subsequent stage codes only the component Cb, and omits the coding of the Cr residual coefficient.

Returning to FIG. 1, the transformation/quantization unit 105 first generates the orthogonal transform coefficients (residual coefficients that have undergone an orthogonal transform) by performing orthogonal transform processing corresponding to the size of the sub-block on the prediction errors. Next, the transformation/quantization unit 105 determines whether or not to use integrated chroma residual coefficient coding from the correlation relationship of the generated orthogonal transform coefficients of the components Cb and Cr. In other words, the transformation/quantization unit 105 determines whether or not the orthogonal transform coefficient of the component Cb multiplied by (−1) is close to the orthogonal transform coefficient of the component Cr, and if the coefficients are determined to be close, it is determined that integrated chroma residual coefficient coding is to be used. The transformation/quantization unit 105 also generates information indicating whether or not to use integrated chroma residual coefficient coding (one bit is sufficient) as chroma integration information. The transformation/quantization unit 105 then quantizes the orthogonal transform coefficients according to the color components using the quantization matrices stored in the quantization matrix holding unit 103, and generates the residual coefficients (orthogonal transform coefficients that have been quantized). The present embodiment assumes that the quantization matrix in FIG. 8A is used for the Y component orthogonal transform coefficients, the quantization matrix in FIG. 8B is used for the Cb component orthogonal transform coefficients, and the quantization matrix in FIG. 8C is used for the Cr component orthogonal transform coefficients. However, the quantization matrices used are not limited thereto. Additionally, when it is determined that integrated chroma residual coefficient coding is to be used, the Cb component orthogonal transform coefficients are quantized using the quantization matrix in FIG. 8B, and the quantization of the Cr component orthogonal transform coefficients and the outputting to a subsequent are omitted. This makes it possible to reduce the amount of computations by an amount corresponding to the quantization of the Cr component, which is not used in the processing in subsequent stages. The generated residual coefficients and chroma integration information are output to the coding unit 110 and the inverse quantization/inverse transformation unit 106.

The inverse quantization/inverse transformation unit 106 reconstructs the orthogonal transform coefficients (more precisely, the residual coefficients which have not been quantized but have undergone an orthogonal transform) by using the quantization matrices stored in the quantization matrix holding unit 103 to inverse-quantize the residual coefficients input from the transformation/quantization unit 105 (the quantized orthogonal transform coefficients). The inverse quantization/inverse transformation unit 106 furthermore performs an inverse orthogonal transform on the reconstructed orthogonal transform coefficients and reconstructs the prediction errors. As with the transformation/ quantization unit 105, quantization matrices corresponding to the color components of the sub-blocks to be coded are used in the inverse quantization processing. Specifically, the inverse quantization/inverse transformation unit 106 performs the inverse quantization using the same quantization matrices as those used by the transformation/quantization unit 105. In other words, the quantization matrix in FIG. 8A is used for the Y component residual coefficients, the quantization matrix in FIG. 8B is used for the Cb component residual coefficients, and the quantization matrix in FIG. 8C is used for the Cr component residual coefficients.

Additionally, when the chroma integration information indicates that integrated chroma residual coefficient coding is to be used in the sub-block, the inverse quantization/ inverse transformation unit 106 reconstructs the Cb component orthogonal transform coefficients by performing inverse quantization using the quantization matrix 801 in FIG. 8B for the Cb component residual coefficients. The inverse quantization/inverse transformation unit 106 multiplies the reconstructed Cb component orthogonal transform coefficients by "−1" to reconstruct the Cr component orthogonal transform coefficients. The prediction errors reconstructed by performing an inverse orthogonal transform on the reconstructed orthogonal transform coefficients are output to the image reconstruction unit 107.

The image reconstruction unit 107 reconstructs a predicted image by referring to the frame memory 108 as appropriate on the basis of the prediction information input from the prediction unit 104. Then, the image reconstruction unit 107 generates the reconstructed image data on the basis of the reconstructed predicted image and the prediction errors reconstructed by the inverse quantization/inverse transformation unit 106, and stores the reconstructed image data in the frame memory 108.

The in-loop filter unit 109 reads out the reconstructed image data from the frame memory 108, and performs in-loop filter processing such as deblocking filtering. The in-loop filter unit 109 then stores the filtered image data in the frame memory 108 again.

The coding unit 110 generates code data by entropy-coding the residual coefficients in units of sub-blocks, generated by the transformation/quantization unit 105; the chroma integration information; and the prediction information input from the prediction unit 104. If the chroma integration information indicates that integrated chroma residual coefficient coding is not to be used for the corresponding sub-block, the coding unit 110 codes the residual coefficients of all of the Y, Cb, and Cr color components. On the other hand, if the chroma integration information indicates that integrated chroma residual coefficient coding is to be used for the corresponding sub-block, the coding unit 110 codes the residual coefficients of the Y and Cb color components, but does not code the residual coefficients of the Cr component. The entropy coding method is not particularly specified, but Golomb coding, arithmetic coding, Huffman coding, or the like can be used. The coding unit 110 outputs the generated code data to the integrated coding unit 111.

The integrated coding unit 111 forms a bitstream by multiplexing the code data of the aforementioned header with the code data input from the coding unit 110 and the like. The integrated coding unit 111 then outputs the formed bitstream from the output terminal 112 to the exterior (a recording medium, a network, or the like).

FIG. 6A is an example of the data structure of the bitstream output in the present embodiment. A sequence header contains the code data of the quantization matrices, and is constituted by a coding result for each element. However, the location that is coded is not limited thereto, and a configuration in which a picture header part or another header part is coded may of course be used. Additionally, if a quantization matrix is to be changed in a sequence, the matrix can be changed by newly coding the quantization matrix. At this time, all of the quantization matrices may be rewritten, or some of the quantization matrices can be changed by specifying the quantization matrix color component corresponding to the quantization matrix to be rewritten.

FIG. 3 is a flowchart illustrating coding processing for one frame, performed by the control unit 150 in the image coding device of the embodiment.

First, before coding the image, in S301, the control unit 150 controls the quantization matrix holding unit 103 to generate and hold the two-dimensional quantization matrices. In correspondence with the 8×8-pixel block, the quantization matrix holding unit 103 of the present embodiment generates and holds the quantization matrices 800 to 802 illustrated in FIGS. 8A to 8C, which correspond to the respective color components, namely the Y component, the Cb component, and the Cr component.

In S302, the control unit 150 controls the quantization matrix coding unit 113 to scan the quantization matrices generated and held in S301, calculate differences among the respective elements, and generate the difference matrices. In the present embodiment, the difference matrices 1001 to 1003 illustrated in FIGS. 10A to 10C are generated by using the scanning method in FIG. 9A or FIG. 9B on the quantization matrices 800 to 802 illustrated in FIGS. 8A to 8C. The control unit 150 then controls the quantization matrix coding unit 113 to code the generated difference matrices and generate the quantization matrix code data.

In S303, the control unit 150 controls the integrated coding unit 111 to code and output the generated quantization matrix code data along with the header information necessary for coding the image data. In S304, the control unit 150 controls the block division unit 102 to divide the input image, which is in units of frames, into units of basic blocks. In S305, the control unit 150 controls the prediction unit 104 to execute prediction processing on the image data in the units of basic blocks generated in S304, to generate prediction information such as sub-block division information and the prediction mode, as well as the predicted image data. Furthermore, the control unit 150 controls the prediction unit 104 to calculate the prediction errors from the input image data and the predicted image data.

In S306, the control unit 150 controls the transformation/ quantization unit 105 to perform an orthogonal transform on the prediction errors calculated in S305 and generate the transform coefficients. Furthermore, the control unit 150 controls the transformation/quantization unit 105 to quantize the quantization matrices generated and held in S301 and generate the residual coefficients. In parallel with this, the transformation/quantization unit 105 is caused to determine whether or not to use integrated chroma residual coefficient coding, which codes the Cb and Cr residual coefficients together. The present embodiment assumes that the quantization matrix in FIG. 8A is used for the Y component orthogonal transform coefficients, the quantization matrix in FIG. 8B is used for the Cb component orthogonal transform coefficients, and the quantization matrix in FIG. 8C is used for the Cr component orthogonal transform coefficients. Additionally, when integrated chroma residual coefficient coding is to be used, the Cb component orthogonal transform coefficients are quantized using the quantization matrix in FIG. 8B, and the quantization of the Cr component orthogonal transform coefficients is omitted.

Note that as the processing for determining whether or not to use integrated chroma residual coefficient coding, the following can be given as specific processing for determining whether or not the result of multiplying the orthogonal transform coefficients of the component Cb by (−1) is close to the orthogonal transform coefficients of the component Cr.

The orthogonal transform coefficients are 4λ4 for both the components Cb and Cr. Here, the transform coefficients for the scanning order in FIG. 9B are represented as Cb(i) and Cr(i) (where i=0, 1, . . . 15). Cr(i) is close to the value obtained by multiplying Cb(i) by "−1" when the relationship between the two can be regarded as the following relationship for i=0, 1, 2, and so on.

$$Cb(i) \approx -Cr(i)$$

(Here, "≈" indicates that the two sides are approximately equal.) In other words, this corresponds to a case where the sum of the chroma Cb and Cr is less than or equal to a threshold, as indicated by the following equation.

$$|Cb(i)+Cr(i)| \leq threshold$$

Here, |x| represents the absolute value of a real number x.

In the embodiment, the number of chroma component coefficients is 4×4, and thus if the following equation is satisfied using a predetermined threshold Th, it is safe to determine that the orthogonal transform coefficients of the component Cb multiplied by (−1) are close to the orthogonal transform coefficients of the component Cr.

$$\Sigma |Cb(i)+Cr(i)| < Th$$

(Here, Σ represents the sum of i=0, 1, . . . 15.)

Note that instead of determining the absolute value, the determination may be made from the sum of squares of the sum of the two chroma on the left side, as indicated by the following equation.

$$\Sigma \{Cb(i)+Cr(i)\}^2 < Th$$

In the foregoing embodiment, integrated chroma residual coefficient coding is used when a negative correlation relationship is found between the residual coefficients of Cb and the residual coefficients of Cr, but is should be noted that the configuration is not limited thereto. The correlation relationship can also be generalized as Cb(i)≈Cr(i) (where a is an integer). In this case, in the process for determining whether or not to use integrated chroma residual coefficient coding, a condition such as $$\Sigma \{|Cb(i)|-|Cr(i)/a|\} < Th$$

or $$\Sigma \{|Cb(i)|-|Cr(i)/a|\}^2 < Th$$

is used. Integrated chroma residual coefficient coding is applied when these conditions are satisfied.

Note that the information "a" indicating the correlation relationship may be coded.

In S307, the control unit 150 controls the inverse quantization/inverse transformation unit 106 to inverse-quantize the residual coefficients generated in S306 using the quantization matrices generated and held in S301, and reconstruct the orthogonal transform coefficients. In this step, the same quantization matrices are those used in S306 are used to perform the inverse quantization process. Additionally, when integrated chroma residual coefficient coding is to be used, the Cb component residual coefficients are inverse-quantized using the quantization matrix in FIG. 8B, and the Cb component orthogonal transform coefficients are reconstructed. Furthermore, the reconstructed Cb component orthogonal transform coefficients are multiplied by "−1" to reconstruct the Cr component orthogonal transform coefficients. Then, an inverse orthogonal transform is performed on the reconstructed orthogonal transform coefficients, and the prediction errors are reconstructed.

In S308, the control unit 150 controls the image reconstruction unit 107 to reconstruct the predicted image on the basis of the prediction information generated in S305, reconstruct the image data from the reconstructed predicted image and the prediction errors generated in S307, and store the image data in the frame memory 108.

In S309, the control unit 150 controls the coding unit 110 to code the prediction information generated in S305 and the residual coefficients, chroma integration information, and the like generated in S306, and generate the code data. Here, if the chroma integration information indicates that integrated chroma residual coefficient coding is not to be used for the corresponding sub-block, the coding unit 110 codes the residual coefficients of all of the Y, Cb, and Cr color components. On the other hand, if the chroma integration information indicates that integrated chroma residual coefficient coding is to be used for the corresponding sub-block, the coding unit 110 codes the residual coefficients of the Y and Cb color components, but omits the coding of the residual coefficients of the Cr component. Instead of coding the residual coefficients of the Cb component, the average value of the residual coefficients of the Cb component and a sign-reversed value of the residual coefficients of the Cr component may be coded as the coded data of the color components when using integrated chroma residual coefficient coding. In this case, degradation in color reproduction of the decoded image can be suppressed. Additionally, the coding unit 110 outputs the generated code data to the integrated coding unit 111. The integrated coding unit 111 positions the coded data from the coding unit 110 so as to follow the header generated earlier, and outputs the data.

In S310, the control unit 150 determines whether or not the coding has ended for all the basic blocks in the frame of interest. If the control unit 150 determines that the coding has ended, the sequence moves to step S311, whereas if the control unit 150 determines that an uncoded basic block remains, the sequence returns to S304 and the coding continues from the next basic block.

In S311, the control unit 150 controls the in-loop filter unit 109 to perform in-loop filter processing on the image data reconstructed in S308 and generate a filtered image, and ends the processing.

The above-described configuration and operations, and S306 in particular, make it possible to control quantization for each frequency component and improve the subjective image quality by performing quantization using quantization matrices for sub-blocks that use integrated chroma residual coefficient coding.

Although the present embodiment describes a configuration in which the quantization matrix in FIG. 8B is used when using integrated chroma residual coefficient coding, the quantization matrix that is used is not limited thereto. For example, the same effects can be achieved by a configuration in which the quantization and inverse quantization are performed using the quantization matrix for the Cr component in FIG. 8C. A configuration is also possible in which the quantization and inverse quantization are performed having generated a new quantization matrix using the existing quantization matrix in FIG. 8B, 8C, or the like.

Furthermore, a configuration in which a different quantization matrix is coded for integrated chroma residual coefficient coding may also be used. A configuration is also possible in which in addition to the existing quantization matrices 800 to 802 in FIGS. 8A to 8C, a quantization matrix 803 for integrated chroma residual coefficient coding, illustrated in FIG. 8D, is used to perform coding, and is used in the quantization of the sub-blocks for which the integrated chroma residual coefficient coding is used. This makes it possible to achieve independent quantization control on the sub-blocks which use integrated chroma residual coefficient coding.

Furthermore, although the present embodiment describes a configuration in which the quantization matrix for the sub-blocks in which integrated chroma residual coefficient coding is used is determined uniquely, a configuration in which the quantization matrix can be selected by introducing identifiers may also be used. For example, FIG. 6B illustrates a quantization matrix that is selective with respect to sub-blocks for which integrated chroma residual coefficient coding is used, by newly introducing chroma matrix information (assumed to be two bits) for specifying the quantization matrix.

For example, when the chroma matrix information is 0, the quantization matrix for the Cb component, indicated in FIG. 8B, is used on the sub-blocks for which integrated chroma residual coefficient coding is used. When the chroma matrix information is 1, the quantization matrix for the Cr component, indicated in FIG. 8C, is used on the sub-blocks for which integrated chroma residual coefficient coding is used. On the other hand, when the chroma matrix information is 2, FIG. 8D, which is coded individually, is used on the sub-blocks for which integrated chroma residual coefficient coding is used. This makes it possible to selectively achieve a reduction in the quantization matrix code amount and unique quantization control for the sub-blocks for which integrated chroma residual coefficient coding is used.

To describe the above in more detail, when the chroma integration information of a given sub-block in a given picture (in the present embodiment, sub-block=basic block) indicates that integrated chroma residual coefficient coding is not to be used, the transform coefficients of the component Cb in that sub-block are quantized using the quantization matrix 801 illustrated in FIG. 8B, whereas the transform coefficients of the Cr component are quantized using the quantization matrix 802 in FIG. 8C.

On the other hand, when the chroma integration information of a given sub-block of a given picture indicates that integrated chroma residual coefficient coding is to be used, which of the sub-blocks of the components Cb and Cr are to be coded depends on the chroma matrix information stored in the header. For example, when the chroma matrix information is 0, of the components Cb and Cr, the transform coefficients of the sub-blocks of the component Cb are quantized using the quantization matrix 801 in FIG. 8B and coded, whereas the quantization and the coding of the component Cr are omitted. In addition, when the chroma matrix information is 1, of the components Cb and Cr, the transform coefficients of the sub-blocks of the component Cr are quantized using the quantization matrix 802 in FIG. 8C and coded, whereas the quantization and coding of the component Cb are omitted (the component Cb may be coded, and the component Cr may be omitted). Then, when the chroma matrix information is 2, of the components Cb and Cr, the transform coefficients of the sub-blocks of the component Cb (or the component Cr) are quantized using the quantization matrix 803 in FIG. 8D and coded, whereas the quantization and the coding of the component Cr (or the component Cb) are omitted.

Note that when the quantization matrix 803 in FIG. 8D is used, the coded data of the quantization matrix 803 is stored in the header. In other words, the quantization matrix holding unit 103 generates and holds the quantization matrix 803, and the quantization matrix coding unit 113 also codes the quantization matrix 803.

Figure 2:
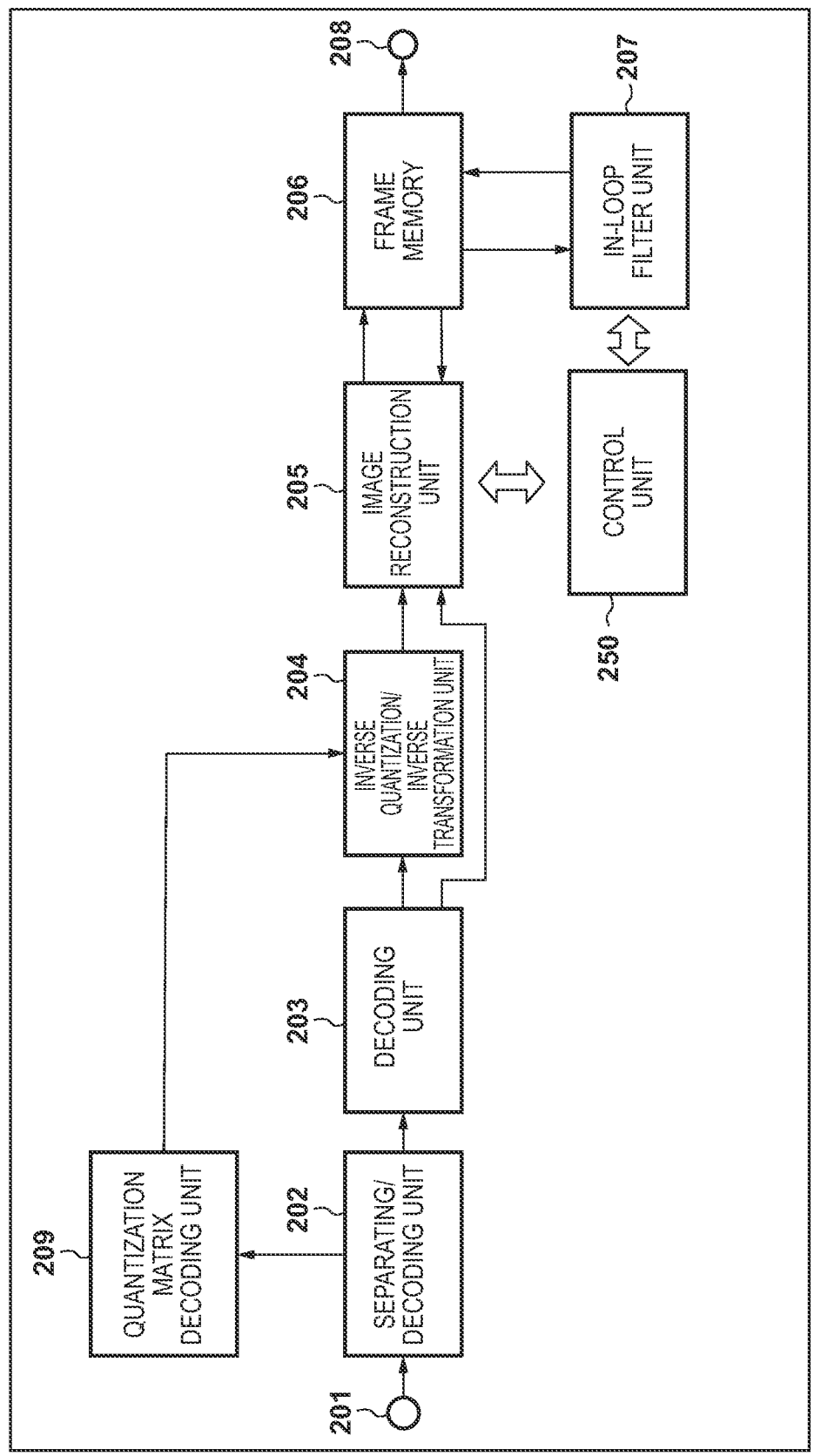
FIG. 2 is a block diagram illustrating an image decoding device according to the first embodiment.

FIG. 2 is a block diagram illustrating an image decoding device that decodes the coded image data generated by the above-described image coding device according to the embodiment. A configuration and operations pertaining to decoding processing will be described with reference to the drawing.

The image decoding device includes a control unit 250 that controls the device as a whole. This control unit 250 includes a CPU, ROM that stores programs executed by the CPU, and RAM used as a work area for the CPU. The image decoding device also includes an input terminal 201, a separating/decoding unit 202, a decoding unit 203, and inverse quantization/inverse transformation unit 204, an image reconstruction unit 205, frame memory 206, an in-loop filter unit 207, an output terminal 208, and a quantization matrix decoding unit 209.

The input terminal 201 inputs a coded bitstream, and although the input source is, for example, a storage medium storing a coded stream, the type of the input source is not limited, and the stream may be input from a network.

The separating/decoding unit 202 separates information pertaining to the decoding processing, code data pertaining to the coefficients, and the like from the bitstream, and also decodes code data present in the header part of the bitstream. The separating/decoding unit 202 of the present embodiment separates the quantization matrix code data and outputs that data to the quantization matrix decoding unit 209. The separating/decoding unit 202 also outputs code data of the image to the decoding unit 203. In other words, the separating/decoding unit 202 performs the reverse of the operations of the integrated coding unit 111 in FIG. 1.

The quantization matrix decoding unit 209 reconstructs and holds the quantization matrices by decoding the quantization matrix code data supplied from the separating/decoding unit 202.

The decoding unit 203 decodes the code data of the image input from the separating/decoding unit 202, and reconstructs the residual coefficients, the chroma integration information, and the prediction information.

Like the inverse quantization/inverse transformation unit 106 in FIG. 1, the inverse quantization/inverse transformation unit 204 reconstructs the prediction errors by inverse-quantizing the residual coefficients using the reconstructed quantization matrices, obtaining inverse-quantized coefficients, and furthermore executing an inverse orthogonal transform.

The image reconstruction unit 205 generates predicted image data by referring to the frame memory 206 as appropriate on the basis of the input prediction information. Then, the image reconstruction unit 205 generates reconstructed image data from the predicted image data and the prediction errors reconstructed by the inverse quantization/inverse transformation unit 204, and stores the reconstructed image data in the frame memory 206.

Like the in-loop filter unit 109 in FIG. 1, the in-loop filter unit 207 performs in-loop filter processing such as deblocking filtering on the reconstructed image data stored in the frame memory 206, and stores the filtered image data in the frame memory again.

The output terminal 208 outputs the frame images stored in the frame memory 206 to the exterior in sequence. Although the output destination is typically a display device, another device may be used instead.

Operations pertaining to decoding images, performed by the image decoding device of the embodiment as described above, will be described in further detail. The present embodiment uses a configuration in which the coded bitstream is input in units of frames.

In FIG. 2, one frame's worth of the bitstream, input from the input terminal 201, is supplied to the separating/decoding unit 202. The separating/decoding unit 202 separates the information pertaining to the decoding processing, code data pertaining to the coefficients, and the like from the bitstream, and decodes the code data present in the header part of the bitstream. Then, the separating/decoding unit 202 supplies the quantization matrix code data included in the header part to the quantization matrix decoding unit 209, and supplies the code data of the image data to the decoding unit 203. Specifically, the separating/decoding unit 202 first extracts the quantization matrix code data from the sequence header of the bitstream illustrated in FIG. 6A, and outputs the quantization matrix code data to the quantization matrix decoding unit 209. In the present embodiment, the quantization matrix code data corresponding to the quantization matrices illustrated in FIGS. 8A to 8C is extracted and output. Then, code data in units of basic blocks of the picture data is extracted and output to the decoding unit 203.

The quantization matrix decoding unit 209 first decodes the input quantization matrix code data, and then reconstructs the one-dimensional difference matrices 1000 to 1002 illustrated in FIGS. 10A to 10C. Then, as on the coding side, the quantization matrix decoding unit 209 decodes each quantization matrix using the coding table illustrated in FIG. 11A. Although the embodiment assumes that the coding table illustrated in FIG. 11A is used, the coding table illustrated in FIG. 11B may be used instead. In short, it is sufficient to use the same coding table as that used on the coding side. The quantization matrix decoding unit 209 scans the reconstructed one-dimensional difference matrices 1000 to 1002 in reverse, and reconstructs and holds the two-dimensional quantization matrices. The reverse of the operations performed by the quantization matrix coding unit 113 on the coding side is performed here. In other words, the quantization matrix coding unit 113 of the present embodiment decodes the difference matrices 1000 to 1002 illustrated in FIGS. 10A to 10C using the scanning method illustrated in FIG. 9A or FIG. 9B in accordance with the respective sizes thereof. As a result, the quantization matrix coding unit 113 reconstructs and holds the three types of quantization matrices 800 to 802, illustrated in FIGS. 8A to 8C.

The decoding unit 203 decodes the code data supplied from the separating/decoding unit 202, reconstructs the chroma integration information and the prediction information, and furthermore reconstructs the residual coefficients in accordance with the reconstructed chroma integration information. The decoding unit 203 first reconstructs the prediction information, and obtains the prediction mode used for that sub-block. Next, the decoding unit 203 reconstructs the chroma integration information, and determines whether or not integrated chroma residual coefficient coding has been used on that sub-block. If the chroma integration information indicates that integrated chroma residual coefficient coding is not to be used for the corresponding sub-block, the decoding unit 203 decodes and reconstructs the residual coefficients of all of the Y, Cb, and Cr color components. On the other hand, if the chroma integration information indicates that integrated chroma residual coefficient coding is to be used for the corresponding sub-block, the decoding unit 203 decodes the residual coefficients of the Y and Cb color components (there is no coded data for the Cr color component, and thus corresponding decoding processing is not performed). The decoding unit 203 outputs the reconstructed chroma integration information and residual coefficients to the inverse quantization/inverse transformation unit 204, and outputs the reconstructed prediction information to the image reconstruction unit 205.

The inverse quantization/inverse transformation unit 204 generates the orthogonal transform coefficients by inverse-quantizing the input residual coefficients using the quantization matrices reconstructed by the quantization matrix decoding unit 209, and furthermore reconstructs the prediction errors by performing an inverse orthogonal transform. Like the inverse quantization/inverse transformation unit 106 on the coding side, the inverse quantization/inverse transformation unit 204 performs the inverse quantization using the quantization matrix corresponding to the color component of the sub-block to be decoded. In other words, the quantization matrix in FIG. 8A is used for the Y component residual coefficients, the quantization matrix in FIG. 8B is used for the Cb component residual coefficients, and the quantization matrix in FIG. 8C is used for the Cr component residual coefficients. However, if the chroma integration information indicates that integrated chroma residual coefficient coding has been used in the corresponding sub-block, the residual coefficients of the orthogonal transform coefficients of the Cr component are not supplied from the decoding unit 203. Accordingly, the inverse quantization/inverse transformation unit 204 performs the inverse quantization using the quantization matrix in FIG. 8B for the residual coefficients of the Cb component, and then reconstructs the orthogonal transform coefficients of the Cr component. In other words, the processing efficiency is improved by performing the inverse quantization using the quantization matrix from before the Cr component is reconstructed. Specifically, the inverse quantization/inverse transformation unit 204 multiplies the reconstructed Cb component orthogonal transform coefficients by $(-1)$ to reconstruct the Cr component orthogonal transform coefficients, and supplies those coefficients to the image reconstruction unit 205. The prediction errors reconstructed by performing an inverse orthogonal transform on the reconstructed orthogonal transform coefficients are output to the image reconstruction unit 205. However, the quantization matrices used are not limited thereto, and any quantization matrices may be used as long as they are the same as those used by the transformation/quantization unit 105 and the inverse quantization/inverse transformation unit 106 on the coding side.

Although the foregoing describes a case of a negative correlation relationship as an example, the configuration is not limited thereto. If a correlation relationship of $Cb(i) \approx aCr(i)$ (where a is an integer) is observed, and integrated chroma residual coefficient coding is performed, the orthogonal transform coefficients of the Cb component multiplied by "a" will be reconstructed as the orthogonal transform coefficients of the Cr component. The information "a" indicating the correlation relationship may be decoded from the bitstream, or may be held in advance as a rule between the coding side and the decoding side.

The image reconstruction unit 205 reconstructs the predicted image by referring to the frame memory 206 as appropriate on the basis of the prediction information input from the decoding unit 203. Like the prediction unit 104 on the coding side, the image reconstruction unit 205 of the present embodiment uses intra prediction such as horizontal prediction, vertical prediction, or the like. The specific prediction processing is the same as that of the prediction unit 104 on the coding side, and will therefore not be described. The image reconstruction unit 205 generates image data from the predicted image and the prediction errors input from the inverse quantization/inverse transformation unit 204, and stores the image data in the frame memory 206. The stored image data is used for reference during prediction.

Like the in-loop filter unit 109 on the coding side, the in-loop filter unit 207 reads out the reconstructed image from the frame memory 206, and performs in-loop filter processing such as deblocking filtering. The in-loop filter unit 207 then stores the filtered image in the frame memory 206 again.

The reconstructed image stored in the frame memory 206 is ultimately output from the output terminal 208 to the exterior (a typical example of which is a display device).

FIG. 4 is a flowchart illustrating decoding processing performed by the control unit 250 in the image decoding device according to the embodiment. First, in S401, the control unit 250 controls the separating/decoding unit 202 to separate the information pertaining to decoding processing, the code data pertaining to coefficients, and the like from the bitstream, and decode the code data of the header part. More specifically, the separating/decoding unit 202 supplies the quantization matrix code data to the quantization matrix decoding unit 209, and supplies the code data of the image to the decoding unit 203.

In S402, the control unit 250 controls the quantization matrix decoding unit 209 to decode the quantization matrix code data reconstructed in S401. As a result, the quantization matrix decoding unit 209 reconstructs the one-dimensional difference matrices 1000 to 1002 illustrated in FIGS. 10A to 10C. Then, the quantization matrix decoding unit 209 scans the one-dimensional difference matrix 1000 as illustrated in FIG. 9A, performs the decoding according to the coding table in FIG. 11A, and reconstructs and holds the quantization matrix 800 in FIG. 8A. Additionally, the quantization matrix decoding unit 209 scans the one-dimensional difference matrices 1001 and 1002 as illustrated in FIG. 9B, performs the decoding according to the coding table in FIG. 11A, and reconstructs and holds the quantization matrices 801 and 802 in FIGS. 8B and 8C.

In S403, the control unit 250 controls the decoding unit 203 to decode the code data separated in S401, reconstruct the chroma integration information and the prediction information, and reconstruct the residual coefficients of the luma component and the chroma residual coefficients according to the chroma integration information. Note that the chroma residual coefficients to be reconstructed may be both Cb and Cr, or only Cb, as described earlier.

In S404, the control unit 250 controls the inverse quantization/inverse transformation unit 204 to inverse-quantize the residual coefficients using the quantization matrices reconstructed in S402, and generate the orthogonal transform coefficients. The inverse quantization/inverse transformation unit 204 furthermore performs an inverse orthogonal transform and reconstructs the prediction errors. In the present embodiment, the quantization matrices to be used in the inverse quantization are determined in accordance with the color components of the sub-block to be decoded. In other words, the inverse quantization/inverse transformation unit 204 inverse-quantizes the Y component residual coefficients using the quantization matrix in FIG. 8A, the Cb component residual coefficients using the quantization matrix in FIG. 8B, and the Cr component residual coefficients using the quantization matrix in FIG. 8C. However, the quantization matrices used are not limited thereto, and any quantization matrices may be used as long as they are the same as those used on the coding side.

However, when the chroma integration information indicates that integrated chroma residual coefficient coding is used in the sub-block, the inverse quantization/inverse transformation unit 204 reconstructs the Cb component orthogonal transform coefficients by performing inverse quantization using the quantization matrix in FIG. 8B for the Cb component residual coefficients. Then, the inverse quantization/inverse transformation unit 204 multiplies the reconstructed Cb component orthogonal transform coefficients by (−1) to reconstruct the Cr component orthogonal transform coefficients.

In S405, the control unit 250 controls the image reconstruction unit 205 to reconstruct the image generated in S403. Specifically, the image reconstruction unit 205 reconstructs the predicted image on the basis of the prediction information by referring to the frame memory 206. At this time, like S305 on the coding side, the image reconstruction unit 205 uses intra prediction such as horizontal prediction, vertical prediction, or the like. Then, the image reconstruction unit 205 reconstructs the image data from the reconstructed predicted image and prediction errors generated in S404, and stores the reconstructed image data in the frame memory 206.

In S406, the control unit 250 determines whether or not the decoding has ended for all the basic blocks in the frame of interest. If not, the sequence moves to S407, whereas if an undecoded block remains, the sequence returns to S403 to decode the next basic block.

In S407, the control unit 250 controls the in-loop filter unit 207 to perform in-loop filter processing on the image data reconstructed in S405 and generate a filtered image, and then ends the processing.

The above-described configuration and operations make it possible to decode a bitstream having improved subjective image quality by controlling quantization for each frequency component, even for a coded bitstream generated by the image coding device described above, i.e., sub-blocks in which integrated chroma residual coefficient coding has been used.

Note that in the present embodiment, decoding processing for a case where the header of the bitstream contains chroma matrix information is performed as follows.

When the chroma integration information of a given sub-block in a given picture (in the present embodiment, sub-block=basic block) indicates that integrated chroma residual coefficient coding is not to be used, the residual coefficients of the component Cb in that sub-block are inverse-quantized using the quantization matrix 801 illustrated in FIG. 8B, whereas the residual coefficients of the Cr component are inverse-quantized using the quantization matrix 802 in FIG. 8C.

On the other hand, when the chroma integration information of a given sub-block of a given picture indicates that integrated chroma residual coefficient coding is to be used, which of the sub-blocks of the components Cb and Cr are to be coded depends on the chroma matrix information stored in the header. This will be described hereinafter.

When the chroma matrix information is 0, of the components Cb and Cr, the residual coefficients of the sub-block of the component Cb are decoded by being inverse-quantized using the quantization matrix 801 in FIG. 8B to obtain transform coefficients. The component Cr is not present, and thus values obtained by multiplying the inverse-quantized transform coefficients of the component Cb by "−1" are generated and decoded as the transform coefficients of the component Cr.

Additionally, when the chroma matrix information is 1, of the components Cb and Cr, the residual coefficients of the sub-block of the component Cr are decoded by being inverse-quantized using the quantization matrix 802 in FIG. 8C to obtain transform coefficients. The component Cb is not present, and thus values obtained by multiplying the inverse-quantized transform coefficients of the component Cr by "−1" are generated and decoded as the transform coefficients of the component Cb.

Additionally, when the chroma matrix information is 2, of the components Cb and Cr, the residual coefficients of the sub-block of one component (e.g., the component Cb) are decoded by being inverse-quantized using the quantization matrix 801 in FIG. 8B to obtain transform coefficients. The other component Cr is not present, and thus values obtained by multiplying the inverse-quantized transform coefficients of the one component by "−1" are generated and decoded as the transform coefficients of the other component.

As a result, it is possible to decode a bitstream which achieves independent quantization control on the sub-blocks which use integrated chroma residual coefficient coding.

Second Embodiment

The processing units of the image coding device and the image decoding device in the foregoing embodiment were described as being constituted by hardware. However, the processing performed by the processing units illustrated in the drawings may be configured by a computer program.

FIG. 5 is a block diagram illustrating an example of the hardware configuration of a computer in which the image coding device and the image decoding device according to the foregoing embodiment can be applied.

A CPU 501 controls the computer as a whole using computer programs, data, and the like stored in RAM 502, ROM 503, and the like, and executes the processing described above as processing performed by an image processing device according to the foregoing embodiment. In other words, the CPU 501 functions as the processing units illustrated in FIGS. 1 and 2.

The RAM 502 has an area for temporarily storing programs, data, and the like obtained from the exterior via an external storage device 506 and an OF (interface) 507. Furthermore, the RAM 502 is also used as a work area when the CPU 501 executes various types of processing. The RAM 502, for example, can be allocated as frame memory, or may provide various other areas as appropriate.

Configuration data, a boot program, and so on for the computer are stored in the ROM 503. An operation unit 504 is constituted by a keyboard, a mouse, and the like, and by manipulating the operation unit 504, a user of the computer can input various types of instructions to the CPU 501. A display unit 505 displays results of processing by the CPU 501. The display unit 505 is constituted by a liquid crystal display, for example.

The external storage device 506 is a high-capacity information storage device as typified by a hard disk drive device. The external storage device 506 stores an OS (operating system), computer programs (application programs) for causing the CPU 501 to implement the functions of each unit illustrated in FIGS. 1 and 2, and the like. The image data to be processed may also be stored in the external storage device 506.

The computer programs, data, and the like stored in the external storage device 506 are loaded into the RAM 502 as appropriate under the control of the CPU 501, and are then processed by the CPU 501. Networks such as LANs and the Internet, other devices such as projection devices and display devices, and the like can be connected to the OF 507, and the computer can obtain and send various information via this OF 507. 508 indicates a bus that connects the aforementioned units to each other.

In the above-described configuration, when the power of the device is turned on, the CPU 501 executes a boot program stored in the ROM 503, loads the OS stored in the external storage device 506 into the RAM 502, and executes the OS. Then, under the control of the OS, the CPU 501 loads an application program for coding or decoding from the external storage device 506 into the RAM 502 and executes the program. As a result, the CPU 501 functions as the processing units illustrated in FIG. 1 or FIG. 2, and therefore this device functions as the image coding device or the image decoding device.

According to the present disclosure, the degradation of subjective image quality can be suppressed while improving the coding efficiency of residual coefficients of two chroma components.

The present disclosure can be used in coding devices and decoding devices that code and decode still images and moving images. The present disclosure is particularly applicable in coding schemes and decoding schemes that use quantization matrices.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

INDUSTRIAL APPLICABILITY

The present disclosure can be used in coding devices and decoding devices that code and decode still images and moving images. The present disclosure is particularly applicable in coding schemes and decoding schemes that use quantization matrices.

The invention claimed is:

1. An image decoding device decoding coded data of an image according to a predetermined manner, comprising:
 a decoding unit configured to decode, from the coded data, data corresponding to quantized transform coefficients; and
 a deriving unit configured to derive prediction errors from the decoded data by performing at least inverse quantization using a quantization matrix,
 wherein prediction errors corresponding to a chroma component can be derived using a first mode,
 wherein the image includes a plurality of chroma components,
 wherein the first mode is a mode in which encoded data of first quantized transform coefficients associated with a first chroma component among the plurality of chroma components is omitted in the coded data,
 wherein, in the first mode, the deriving unit is configured to derive first prediction errors of the first chroma component, using quantized transform coefficients associated with a chroma component different from the first chroma component,
 wherein, in the first mode, the deriving unit is configured to perform inverse quantization on the quantized transform coefficients used to derive the first prediction errors of the first chroma component, using the quantizing matrix corresponding to the chroma component different from the first chroma component, and
 wherein 4:2:0 color format is capable of being used in the predetermined manner.

2. The image decoding device according to claim 1, wherein the plurality of chroma components include a second chroma component,
 wherein, in a second mode different from the first mode, data corresponding to the first quantized transform coefficients and data corresponding to the second quantized transform coefficients associated with the second chroma component are coded independently in the coded data.

3. The image decoding device according to claim 1, wherein, in the first mode, the deriving unit is configured to derive the first prediction errors by multiplying values related to the chroma component different from the first chroma component by a predetermined value.

4. The image decoding device according to claim 1, wherein, in the first mode, the decoding unit is configured to further decode information specifying an equation used to derive the first prediction errors.

5. A method of decoding coded data of an image according to a predetermined manner, comprising:
 decoding, from the coded data, data corresponding to quantized transform coefficients; and
 deriving prediction errors from the decoded data by performing at least inverse quantization using a quantization matrix,
 wherein prediction errors corresponding to a chroma component can be derived using a first mode,
 wherein the image includes a plurality of chroma components,
 wherein the first mode is a mode in which encoded data of first quantized transform coefficients associated with a first chroma component among the plurality of chroma components is omitted in the coded data,
 wherein, in the deriving in the first mode, first prediction errors of the first chroma component are derived, using quantized transform coefficients associated with a chroma component different from the first chroma component,
 wherein, in the deriving in the first mode, inverse quantization is performed on the quantized transform coefficients used to derive the first prediction errors of the first chroma component, using the quantizing matrix corresponding to the chroma component different from the first chroma component, and
 wherein 4:2:0 color format is capable of being used in the predetermined manner.

6. The method according to claim 5, wherein the plurality of chroma components include a second chroma component,
 wherein, in a second mode different from the first mode, data corresponding to the first quantized transform coefficients and data corresponding to the second quantized transform coefficients associated with the second chroma component are coded independently in a bitstream.

7. The method according to claim 5, wherein, in the first mode, the first prediction errors are derived by multiplying values related to the chroma component different from the first chroma component by a predetermined value.

8. The method according to claim 5, wherein, in the decoding in the first mode, information specifying an equation used to derive the first prediction errors are further decoded.

9. A non-transitory computer-readable storage medium storing a computer program which, when read and executed by a computer, causes the computer to execute the steps of a method of decoding coded data of an image according to a predetermined manner, wherein the method comprising:
 decoding, from the coded data, data corresponding to quantized transform coefficients; and
 deriving prediction errors from the decoded data by performing at least inverse quantization using a quantization matrix,
 wherein prediction errors corresponding to a chroma component can be derived using a first mode,
 wherein the image includes a plurality of chroma components,
 wherein the first mode is a mode in which encoded data of first quantized transform coefficients associated with a first chroma component among the plurality of chroma components is omitted in the coded data,
 wherein, in the deriving in the first mode, first prediction errors of the first chroma component are derived, using quantized transform coefficients associated with to a chroma component different from the first chroma component,
 wherein, in the deriving in the first mode, inverse quantization is performed on the quantized transform coefficients used to derive the first prediction errors of the first chroma component, using the quantizing matrix corresponding to the chroma component different from the first chroma component, and wherein 4:2:0 color format is capable of being used in the predetermined manner.

* * * * *